United States Patent [19]

Ichikawa

[11] Patent Number: 5,293,549
[45] Date of Patent: Mar. 8, 1994

[54] DIGITAL SIGNAL APPARATUS FOR CORRECTLY DEMODULATING DATA DESPITE A FLUCTUATION IN READING RATE OR VARIATION IN REGENERATED PULSE DURATION DUE TO ABNORMALITIES IN A RECORDING MEDIUM FROM WHICH DATA IS BEING READ

[75] Inventor: Kaori Ichikawa, Koganei, Japan

[73] Assignee: Olympus Optical Co., Ltd., Tokyo, Japan

[21] Appl. No.: 881,768

[22] Filed: May 12, 1992

[30] Foreign Application Priority Data

May 16, 1991 [JP] Japan .................................. 3-111869
Sep. 27, 1991 [JP] Japan .................................. 3-249401

[51] Int. Cl.$^5$ .................. G11B 5/09; G11B 15/52; G11B 20/10; G11B 27/22
[52] U.S. Cl. .......................................... 360/51; 369/47
[58] Field of Search ............... 360/27, 28, 29, 30, 360/51, 45; 369/47, 49

[56] References Cited

U.S. PATENT DOCUMENTS

| 4,742,403 | 5/1988 | Troletti ........................... 360/45 |
| 4,780,772 | 10/1988 | Shibuya et al. ................. 360/51 |
| 5,165,089 | 11/1992 | Jaquette et al. ............... 360/45 |

FOREIGN PATENT DOCUMENTS 57-24700  5/1982  Japan .
62-241176 10/1987  Japan .
03-69069  3/1991  Japan .

*Primary Examiner*—Aristotelis Psitos
*Assistant Examiner*—Jennifer Pearson
*Attorney, Agent, or Firm*—Armstrong, Westerman, Hattori, McLeland & Naughton

[57] ABSTRACT

A digital signal regeneration apparatus measures regeneration output pulses produced by binary-coding an analog signal acquired by reading information from a recording medium to regenerate a digital signal recorded on the recording medium, comprising a pulse spacing extracting circuit for extracting a pulse spacing of a binary-coded regeneration output pulse, a pulse multiple detecting circuit for detecting a multiple indicating how many times a pulse spacing the pulse spacing extracting circuit extracts is larger than a reference cycle, a reference cycle calculating circuit for calculating a new reference cycle using the pulse spacings and multiples of a plurality of predetermined contiguous regeneration output pulses sent from the pulse spacing extracting circuit and pulse multiple detecting circuit, a clock generating circuit for generating a demodulating clock using the reference cycle the reference cycle calculating circuit calculates, a clock synchronizing circuit for synchronizing a demodulating clock the clock generating circuit generates in phase with regeneration output pulses in given durations, and synchronizing the demodulating clock in phase with a regeneration output pulse coming in a given initial range of data regeneration not by locking the demodulating clock in a given interval but by matching the demodulating clock and the regeneration output pulse coming in the given initial range, a demodulating circuit for demodulating a binary-coded regeneration output pulse train using the demodulating clock the clock generating circuit generates.

11 Claims, 9 Drawing Sheets

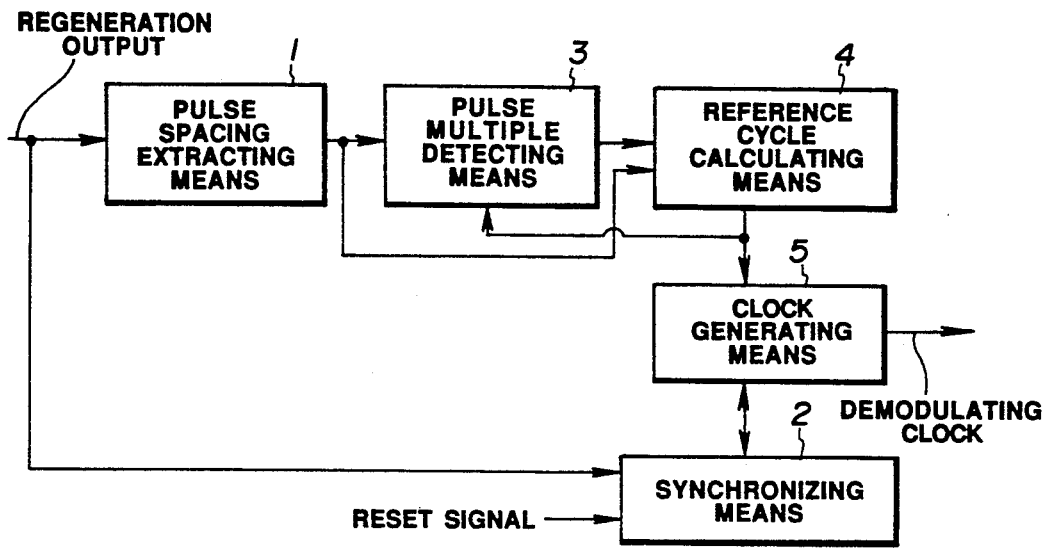
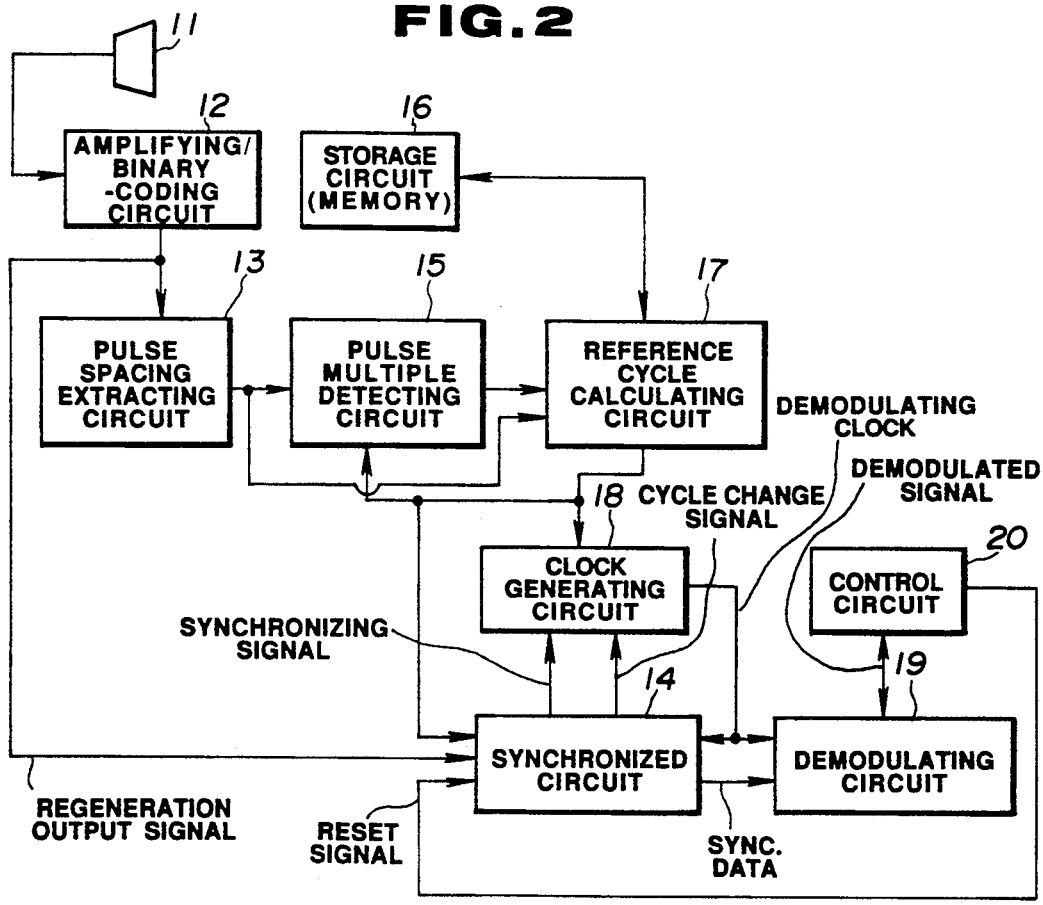

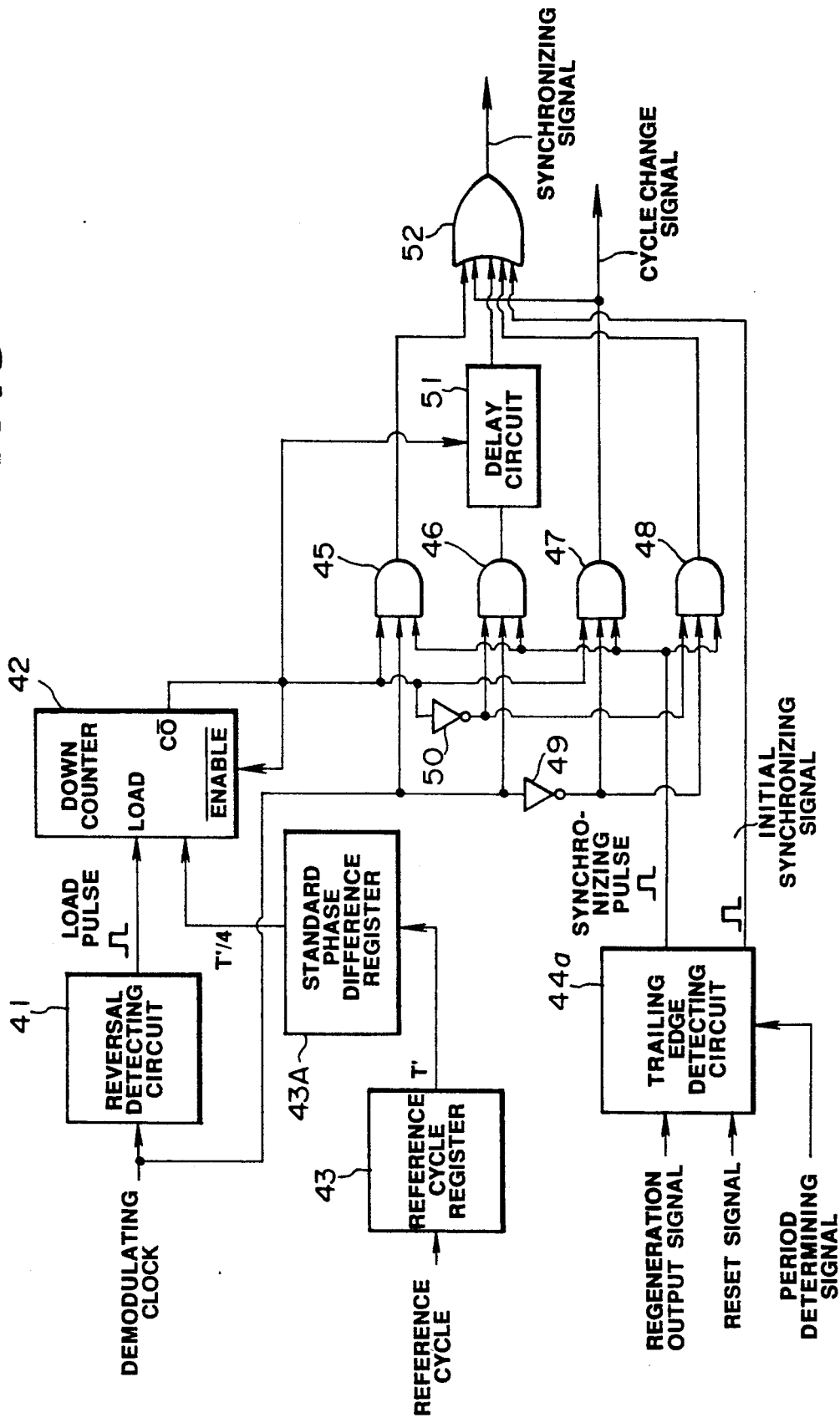

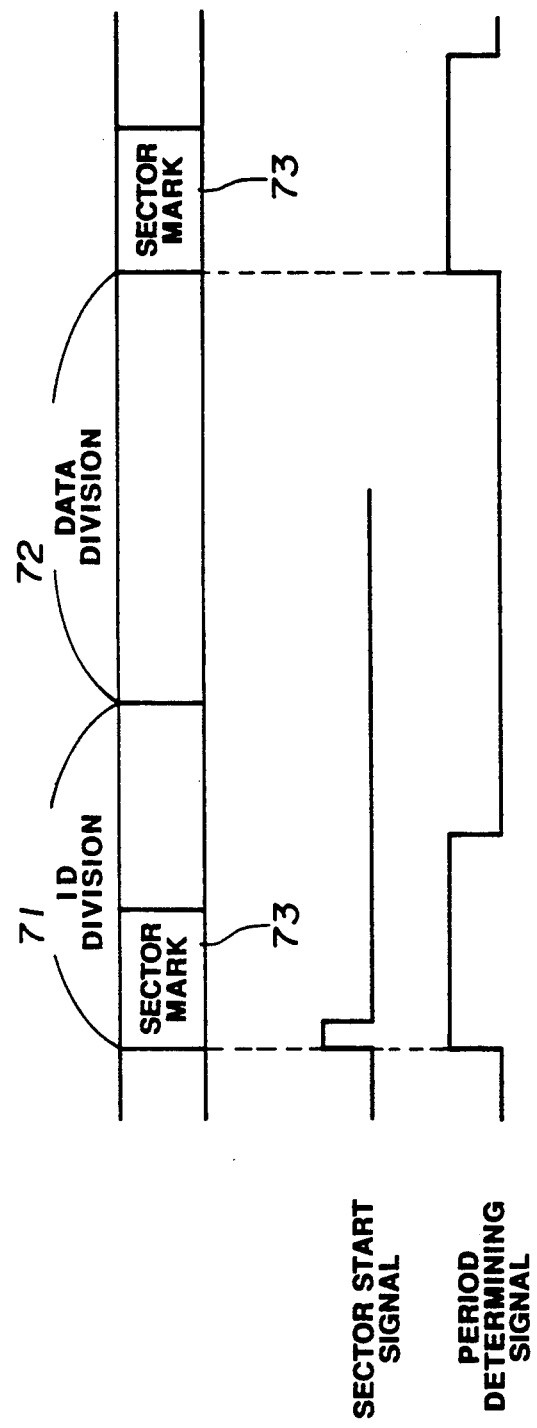

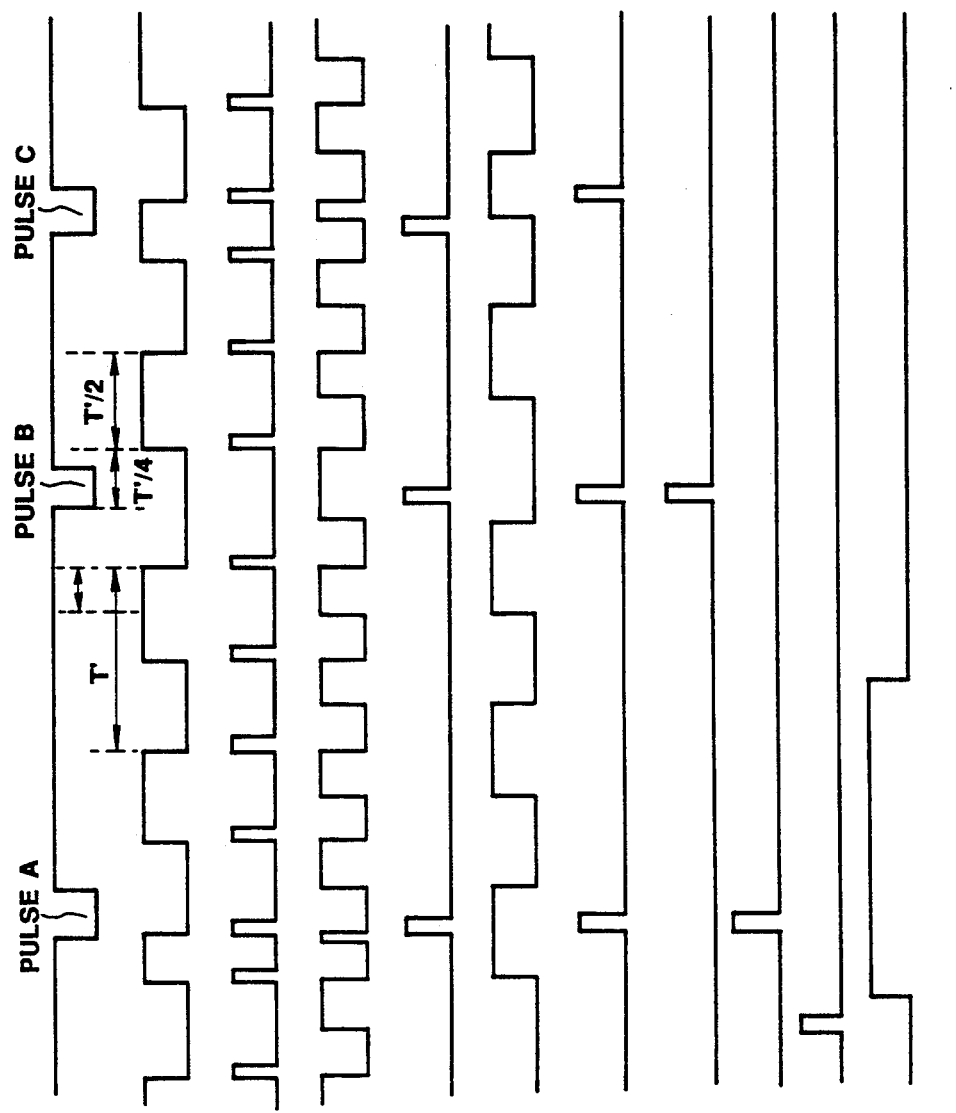

DIGITAL SIGNAL APPARATUS FOR CORRECTLY DEMODULATING DATA DESPITE A FLUCTUATION IN READING RATE OR VARIATION IN REGENERATED PULSE DURATION DUE TO ABNORMALITIES IN A RECORDING MEDIUM FROM WHICH DATA IS BEING READ

BACKGROUND OF THE INVENTION

1. Field of the Invention

The present invention relates to an improved digital signal regeneration apparatus for regenerating digital signals recorded on a floppy disk, magnetic card, optical card, or other recording medium in MFM mode or 2-7 mode.

2. Description of the Related Art

Various digital signal recording/regenerating modes have been proposed in the past. To demodulate digital signals recorded on a recording medium correctly, measures must be taken against a variation in regenerated pulse duration due to a variation in relative moving rate between the recording medium and a read head, or a fluctuation in signal level or a missing signal due to flaws or dust on a medium.

Proposed, for example, in Japanese Patent Examined Publication No. 57-24700 is an analog mode based on a PLL mode which counts a phase difference between a regenerated pulse and a self-pulsing clock, and feeds back the count to the frequency of the self-pulsing clock wherein a read clock is produced to be synchronous with regenerated pulses, then used to demodulate regenerated pulses.

Alternatively, a digital mode uses a generated pulse as a reference to generate a read window signal for each pulse. For example, Japanese Patent Laid-Open No. 62-241176 has been proposed in which a clock bit cycle is extracted from a pulse spacing between regenerated pulses, a compensation clock whose reference cycle is half the extracted clock bit cycle is generated to form a read window signal, and thus regenerated pulses are demodulated.

The present applicant has proposed a digital signal regeneration apparatus is Japanese Patent Laid-Open No. 3-69069. In the digital signal regeneration apparatus, a reference cycle is calculated by averaging several pulse spacings detected during regeneration output, then a demodulation clock is generated to be synchronous with incoming pulses in the calculated clock cycles. This apparatus samples a data bit using a demodulating clock to determine whether demodulation data is 0 or 1.

As described previously, in Japanese Patent Examined Publication No. 57-24700, a phase difference between a regenerated pulse and a self-pulsing clock is fed back to the frequency of the self-pulsing clock, and thus a read clock is produced to be synchronous with regenerated pulses. Once a regenerated pulse and a read clock are out of phase, it takes too much time until the read clock becomes correctly in phase with a regenerated pulse. Moreover, an abrupt variation in pulse duration causes a phase lag. Consequently, the regenerated pulse is demodulated incorrectly. This makes it necessary to install a locking pattern formed with a regular signal train on a medium.

If sectors differ from each other greatly, synchronization may not be achieved. For example, if data is written in multiple sectors using difference equipment among the sectors, the signal interrecord gap may vary from sector to sector because of the differences among the equipment. In a recording mode in which sectors are not interspaced, especially, if sectors are read out consecutively, a synchronous out occurs at the transition from a sector to a succeeding sector. Consequently, data cannot be read from the subsequent sectors.

In Japanese Patent Laid-Open No. 62-241176, a clock bit cycle is extracted from a pulse spacing of an incoming pulse to form a demodulation window. In this case, since the clock cycle varies depending on an incoming pulse, when a pulse position changes drastically due to a fluctuation in moving rate of a medium, demodulation is done incorrectly. For example, when a pulse position shifts behind of a normal position, a pulse preceding the pulse becomes longer but a succeeding pulse becomes shorter. Therefore, if a clock cycle is extended with the preceding pulse, no pulse comes during a window open period. As a result, demodulation if done incorrectly. When a jitter (a distortion of a signal) occurs because of flaws or dust on a medium, if, for example, the pulse duration increases abruptly and the next pulse duration becomes shorter, bits overflow a data window. Specifically, clock bits and data bits are reversed, then demodulated.

In an apparatus according to Japanese Patent Laid-Open No. 3-69069, regenerated signal pulses are selectively synchronized in phase. Therefore, if a phase difference between a first incoming regenerated signal pulse and a clock is too great to achieve synchronization, since a generated clock tracks regenerated signal pulses moderately, the first regenerated signal pulse is not fully in phase with the clock. Furthermore, it takes much time to attain synchronization. Therefore, the apparatus described in the examined publication must have a synchronization pattern for locking on a recording medium in order to ensure precise locking from the beginning of regeneration and reduce the locking time.

Compared with an analog apparatus, the foregoing digital apparatus is good at achieving synchronization. However, when a pulse duration changes drastically from sector to sector, the digital apparatus, similarly to the analog apparatus, may fail to achieve synchronization. Consequently, a synchronous out occurs on a boundary between sectors and thereby subsequent data is not read out.

SUMMARY OF THE INVENTION

The object of the present invention is to provide a digital signal regeneration apparatus capable of correctly demodulating data modulated and recorded in any self-clock mode despite a fluctuation in reading rate of a recording medium or a variation in regenerated pulse duration due to flaws or dust on the medium, or differences among equipment.

Another object of the present invention is to provide a digital signal regeneration apparatus capable of correctly demodulating data modulated and recorded in any self-clock mode, and precisely and reliably synchronizing a demodulating clock with regeneration output pulses during regeneration from when the first regeneration output pulse comes.

Another object of the present invention is to provide a digital signal regeneration apparatus capable of correctly demodulating data modulated and recorded in any self-clock mode, and precisely synchronizing a demodulating clock even with the first regeneration output pulse of a sector.

Another object of the present invention is to provide a digital signal regeneration apparatus capable of producing a demodulating clock reliably and precisely synchronous even with the first regeneration output pulse during regeneration, then locking the demodulating clock onto a regeneration output pulse immediately, and thereby obviating a synchronous locking pattern to be installed in a recording medium, expanding the data capacity of the recording medium, and permitting effective use of the recording area of the recording medium as a data area.

Another object of the present invention is to provide a digital signal regeneration apparatus capable of producing a demodulating clock reliably synchronous even with the first regeneration output pulse of a sector, preventing a synchronous out from occurring on a boundary between sectors, and thereby correctly regenerating even the first data on a medium without being affected by variations in recording rate among sectors.

The present invention provides a digital signal regeneration apparatus for processing binary-coded regeneration output pulses of an analog signal acquired by reading information from a recording medium to generate a digital signal recorded on the recording medium, comprising:

a pulse spacing extracting means for extracting a pulse spacing of a binary-coded regeneration output pulse; a pulse multiple detecting means for detecting a multiple indicating how many times the pulse spacing the pulse spacing extracting means extracts is larger than a reference cycle; a reference cycle calculating means for calculating a new reference cycle using the pulse spacings and multiples of a plurality of predetermined sequential regeneration output pulses; a clock generating means for generating a demodulating clock having the reference cycle the reference cycle calculating means calculates; a clock synchronizing means for synchronizing the demodulating clock the clock generating means generates in phase with regeneration output pulses in given durations, and synchronizing the demodulating clock in phase with a regeneration output pulse coming in a given initial range of data regeneration not by locking the demodulating clock in a given duration but by matching the demodulating clock and regeneration output pulse coming in the initial range; and a demodulating means for demodulating a binary-coded regeneration output pulse train using the demodulating clock the clock generating means generates.

Other features and advantages of the present invention will be apparent with the description below.

BRIEF DESCRIPTION OF THE DRAWINGS

FIG. 1 is a conceptual diagram of the present invention;

FIGS. 2 to 7 relate to the first embodiment of the present invention;

FIG. 2 is a block diagram showing the configuration of the first embodiment of the present invention;

FIG. 3 is a block diagram showing the configuration of an example of a reference cycle calculating circuit shown in FIG. 2;

FIG. 4 is a block diagram showing the configuration of an example of a clock generating circuit;

FIG. 5 is a block diagram showing the configuration of an example of a synchronizing circuit;

FIGS. 6a–j show signal waves from the components of the synchronizing circuit for explaining the operation of the synchronizing circuit;

FIG. 7 shows signal waves for explaining the demodulation of the synchronizing circuit;

FIGS. 8 to 11 relate to the second embodiment of the present invention;

FIG. 8 is a block diagram showing the configuration of the second embodiment;

FIG. 9 is a block diagram showing the configuration of an example of a synchronizing circuit shown in FIG. 8;

FIG. 10 shows output signal waves from a sector mark detector and a forcible synchronization period determination circuit shown in FIG. 8; and FIGS. 11a–k show signal waves from the components of the synchronizing circuit for explaining the operation of the synchronizing circuit shown in FIG. 9.

DETAILED DESCRIPTION OF THE PREFERRED EMBODIMENT

Figure 3:
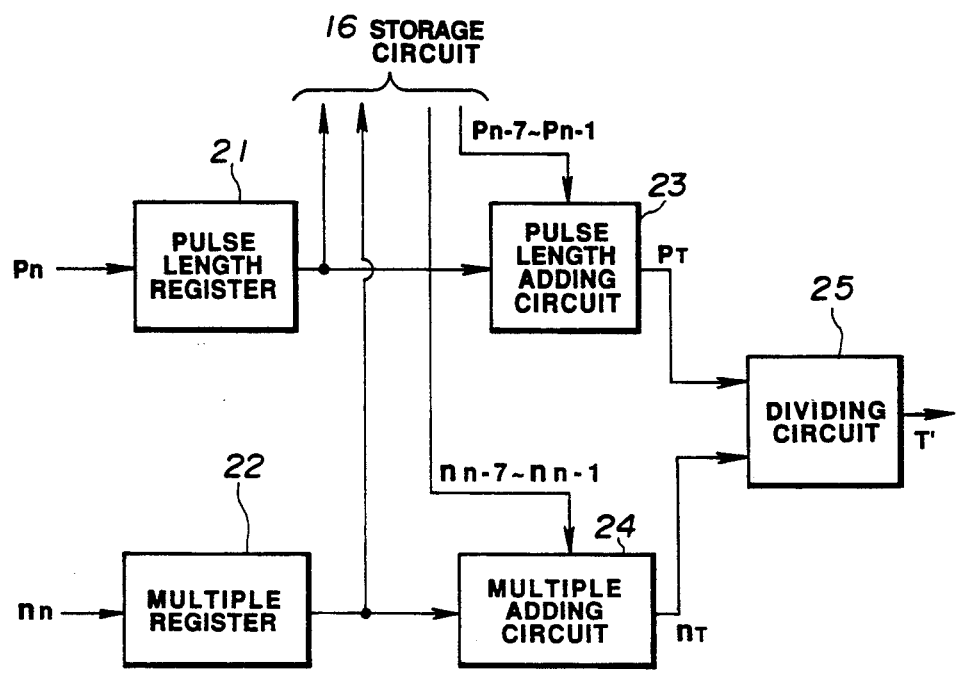

FIG. 1 is a conceptual diagram of the present invention.

A regeneration output signal sent from a regeneration head is binary-coded, then supplied to a pulse spacing extracting means 1 and to a synchronizing means 2. The pulse spacing extracting means 1 sequentially measures pulse spacings of pulses in a pulse train in a regeneration output signal, then supplies the measured pulse spacings to a pulse multiple detecting means 3 and to a reference cycle calculating means 4. The pulse multiple detecting means 3 detects how many times each pulse spacing sent from the pulse spacing extracting means 1 is larger than a reference cycle T', then supplies the detected multiple to the reference cycle calculating means 4. The reference cycle calculating means 4 calculates a new reference cycle T' using the pulse spacings of several pulses and their multiple values with respect to the reference cycle T', then supplies the calculated value to a clock generating means 5 and to the pulse multiple detecting means 3 as a reference cycle for detecting a pulse multiple. The reference cycle T' is determined, for example, by dividing a sum of pulse spacings of several pulses by a sum of the respective pulse fluctuation in relative moving rate between a regeneration head and a recording medium. However, since the reference cycle T' is calculated using pulse spacings of several pulses, a single component causing a variation can be canceled out.

A clock generating means 5 generates and outputs a demodulating clock for demodulating a regeneration output pulse train using a reference cycle T' sent from a reference cycle calculating means 4 and a required synchronizing signal sent from a synchronizing means 2, then supplies the demodulating clock and cycle T' to the synchronizing means 2.

On the other hand, the synchronizing means 2 produces a required synchronizing signal using binary-coded regeneration output pulses, and the demodulating clock and its cycle T' sent from the clock generating means 5, then supplies the synchronizing signal to the clock generating means 5. Thus, the clock generating means 5 synchronizes the demodulating clock with regeneration output pulses in given durations.

Then, the synchronizing means 2 synchronizes the demodulating clock the clock generating means generates with a regeneration output pulse coming first during data regeneration or in a predetermined initial range of a sector not by locking the demodulating clock in a given duration but by matching the demodulating clock and first incoming regeneration output pulse after, for example, a reset signal indicating the initial stage of data regeneration is supplied.

Thus, several regeneration output pulses are used to calculate a reference cycle T', the reference cycle T' is used to generate a demodulating clock, then the demodulating clock is synchronized with regeneration output pulses in given durations. This provides a demodulating clock which moderately tracks a regenerated signal despite a variation in relative moving rate between a regeneration head and a recording medium, but is unaffected by signal distortion due to flaws or dust on a recording medium. Thus, regenerated signals are demodulated correctly. Furthermore, a demodulating clock, which is precisely synchronous with a regeneration output pulse generated first or the first regeneration output pulse of each sector, can be produced to demodulate regenerated signals from the beginning of data regeneration.

Next, embodiments will be described in detail in conjunction with FIG. 2 and thereafter.

FIGS. 2 to 7 show the first embodiment of the present invention.

FIG. 2 is a block diagram showing the first embodiment of the present invention. A regenerated signal sent from a magnetic head, optical head, or other regeneration head 11 for reading signals on a recording medium is trimmed by an amplifying/binary-coding circuit 12. Then, a regeneration output signal formed with a pulse train is produced, then supplied to a pulse spacing extracting circuit 13 and to a synchronizing circuit 14.

The pulse spacing extracting circuit 13 consecutively measures a regeneration output signal for pulse spacings using a counter, then supplies the measured value p to a pulse multiple detecting circuit 15 and to a reference cycle calculating circuit 17.

The pulse multiple detecting circuit 15 divides the measured pulse spacing p by a current reference cycle T' of a clock supplied from a reference cycle calculating circuit to be described later, and thus calculates a multiple n indicating how many times the pulse spacing p is larger than the cycle T', then supplies the multiple n to the reference cycle calculating circuit 17.

A storage circuit 16 sequentially stores multiple (for example, seven) pulse spacings p and multiples n supplied from the pulse spacing extracting circuit 13 and pulse multiple detecting circuit 15 via the reference cycle calculating circuit 17.

The reference cycle calculating circuit 17 calculates a new average (reference) cycle T' using the pulse spacings p and multiples n supplied from the pulse spacing extracting circuit 13 and pulse multiple detecting circuit 15 and a plurality of predetermined sequential pulse spacings p and multiples n existent in the storage circuit 16. More specifically, the reference cycle calculating circuit 17 divides a sum of a predetermined number of sequential pulse spacings p by a sum of respective multiples n. Then, the reference cycle calculating circuit 17 supplies the calculated average cycle T' to a clock generating circuit 18 and a synchronizing circuit 14, and also provides the pulse multiple detecting circuit 15 with the calculated average cycle T' as a reference cycle T' for detecting a pulse multiple. Thus, a sum of multiple sequential pulse spacings p and a sum of respective multiples n are used to calculate a new reference cycle T'. This provides a reference cycle T' canceling out jitter components of individual pulses.

A clock generating circuit 18 generates a demodulating clock for demodulating a pulse train of a regeneration output signal using a reference cycle T' sent from a reference cycle calculating circuit 17 and a required synchronizing signal sent from a synchronizing circuit 14, then supplies the demodulating clock to a synchronizing circuit 14 and to a demodulating circuit 19.

The synchronizing circuit 14 produces a required synchronizing signal using binary-coded regeneration output pulses, a demodulating clock sent from the clock generation circuit 18, and a reference cycle T' sent from the reference cycle calculating circuit 17, then supplies the synchronizing signal to the clock generating circuit 18. Then, the clock generating circuit 18 synchronizes the demodulation clock with pulses of a regeneration output signal in given durations. Herein, the synchronizing signal is generated every time a pulse of a regeneration output signal comes. Then, with the synchronizing signal, the clock generating circuit 18 re-synchronizes the demodulating clock with every incoming pulse of a regeneration output signal. On the other hand, the synchronizing circuit 14 delays generation of a synchronizing signal when the position of an incoming pulse of a regeneration output signal is aberrant or a pulse has a large jitter; that is, when a pulse is leading in phase. When a phase lag occurs, the synchronizing circuit 14 generates a cycle change signal to expedite the cycling of a demodulating clock. Thus, according to a reference cycle T' sent from the reference cycle calculating circuit 17, a synchronizing signal or a cycle change signal is transmitted to the clock generating circuit 18 in a timed sequence of synchronization. Thus, a demodulating clock is synchronized with regeneration output signals in given durations. The synchronizing circuit 14 trims a regeneration output signal so that the regeneration output signal will be synchronous with the demodulating clock, then transmits the trimmed regeneration output signal (sync data) to a demodulating circuit 19.

For the first regeneration output signal pulse received after a control circuit 20 issues a demodulation start command, the synchronizing circuit 14 opens a gate internally in response to a reset signal the control circuit 20 outputs immediately before data regeneration. Then, when the first regeneration output signal pulse arrives after the gate is opened, the synchronizing circuit 14 transmits a synchronizing signal to a clock generating circuit 18. Thereby, whatever phase relationship the first regenerated pulse bears to a clock being generated, synchronization is achieved correctly.

A demodulating circuit 19 samples a regeneration output signal (sync data) trimmed with a demodulating clock in response to a demodulation start or end command sent from a control circuit 20, and thus demodulates the regeneration output signal to output a demodulated signal (demodulated data) representing digital data 0 or 1.

Figure 7:
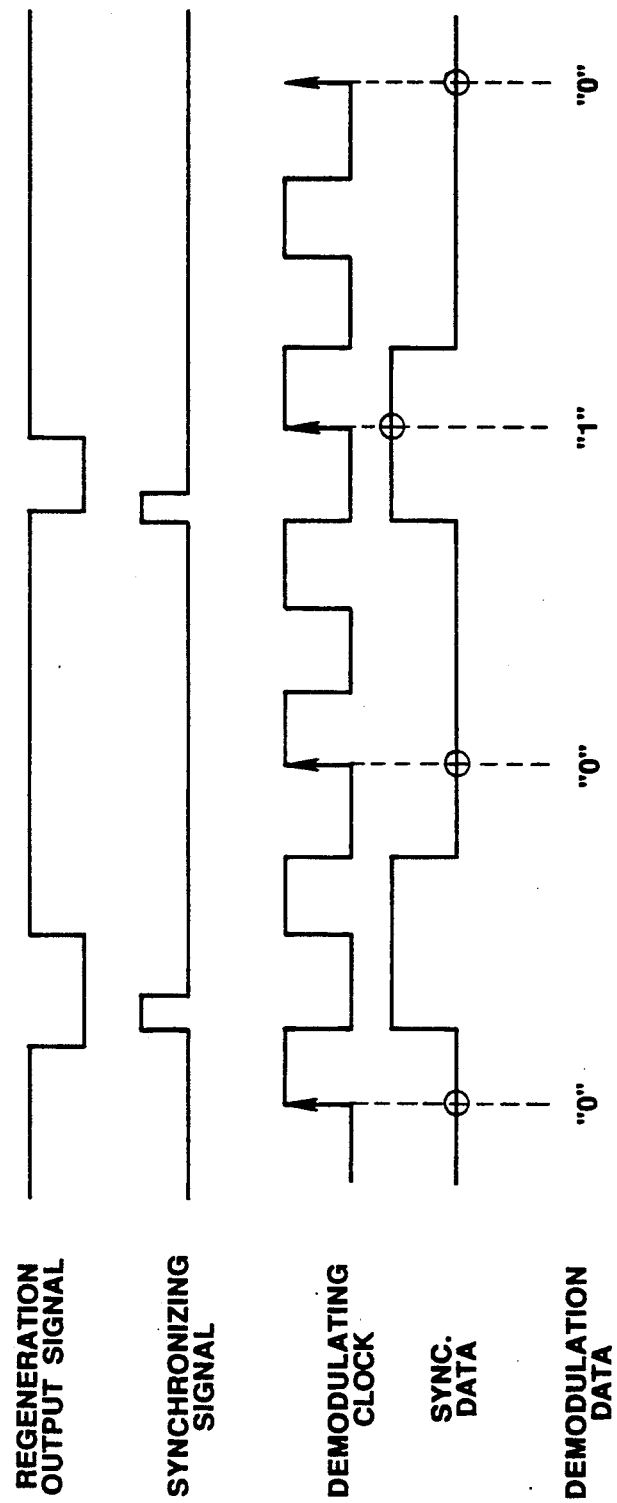
Figure 8:
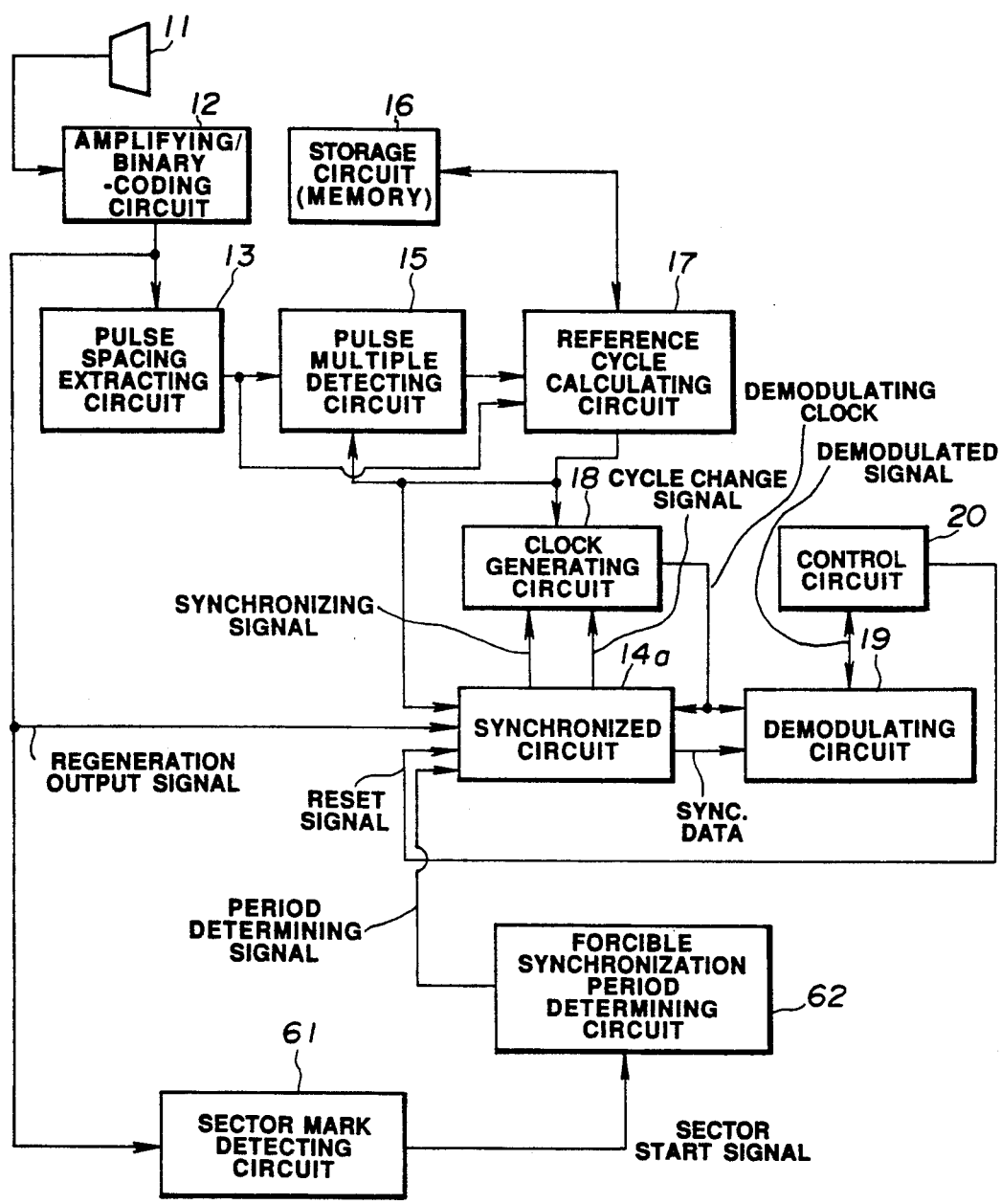

FIG. 7 shows signal waves concerning the aforesaid data demodulation. A demodulating clock is synchronized to coincide with the trailing edge of a regeneration output signal. Then, a demodulating circuit 19 uses the demodulating clock to sample sync data then generates a demodulated signal (demodulated data). Thus, the sync data is demodulated to be digital data. Specifically, at the trailing edge of a regeneration output signal, a demodulating clock is supplied in synchronization with a synchronizing signal which is generated in a given duration. A regeneration output signal is trimmed in synchronization with the demodulating clock, then supplied as sync data. The sync data includes both data and a clock, wherein a clock bit or a data bit indicating a data interval comes with every other demodulating clocks. In FIG. 7, a demodulating clock represents a data bit at arrow-marked edges and a clock bit at other edges. Herein, a clock bit is used exclusively for timing. The demodulating circuit 19 samples a data bit at every arrow-marked leading edge of a demodulating clock, then generates demodulated data. In FIG. 7, a regeneration output signal is modulated according to MFM.

Components of a digital signal regenerating apparatus shown in FIG. 2 will be described using examples specifically.

FIG. 3 shows an example of a configuration of a reference cycle calculating circuit 17. The reference cycle calculating circuit 17 includes a pulse length register 21, a multiple register 22, a pulse length adding circuit 24, and a dividing circuit 25. The pulse length register 21 is formed with, for example, an up counter, which latches a pulse spacing p sent from a pulse spacing extracting circuit 13. The multiple register 22 is formed with, for example, a down counter, which latches a multiple n sent from a pulse multiple detecting circuit 15.

The pulse length register 21 supplies a latched pulse spacing p to a storage circuit 16 and to the pulse adding circuit 23. Similarly, the multiple register 22 supplies a latched multiple n to the storage circuit 16 and to the multiple adding circuit 24.

The pulse length adding circuit 23 calculates a sum $p_T$ of eight pulse spacings including a pulse spacing $p_n$ sent from the pulse length register 21, and seven past pulse spacings $p_{n-1}$ to $p_{n-7}$ stored in the storage circuit 16 before the pulse spacing $p_n$ is supplied, then supplies the sum $p_T$ to the dividing circuit 25. Similarly, the multiple adding circuit 24 calculates a sum $n_T$ of eight multiples including a multiple $n_n$ sent from the multiple register 22 and seven past multiples $n_{n-1}$ to $n_{n-7}$ stored in the storage circuit 16 before the multiple $n_n$ is supplied, then supplies the sum $n_T$ to the dividing circuit 25.

The dividing circuit 25 computes $p_T/n_T$ using the sum $p_T$ of pulse spacings sent from the pulse length adding circuit 23 and the sum $n_T$ of multiples sent from the multiple adding circuit 24, and thereby obtains a reference cycle T'. Then, the dividing circuit 25 supplies the reference cycle T' to a synchronizing circuit 14 and to a clock generating circuit 18, then feeds the reference cycle T' back to the pulse multiple detecting circuit 15 so that the reference cycle T' will be used as a reference cycle for detecting the next pulse multiple.

Thus, a new reference cycle T' the reference cycle calculating circuit 17 calculates is fed back to the pulse multiple detecting circuit 15 and used as a reference cycle for detecting the next pulse multiple. Thereby, even if a pulse duration of a regeneration output signal varies drastically, the regeneration output signal can be followed.

Figure 4:
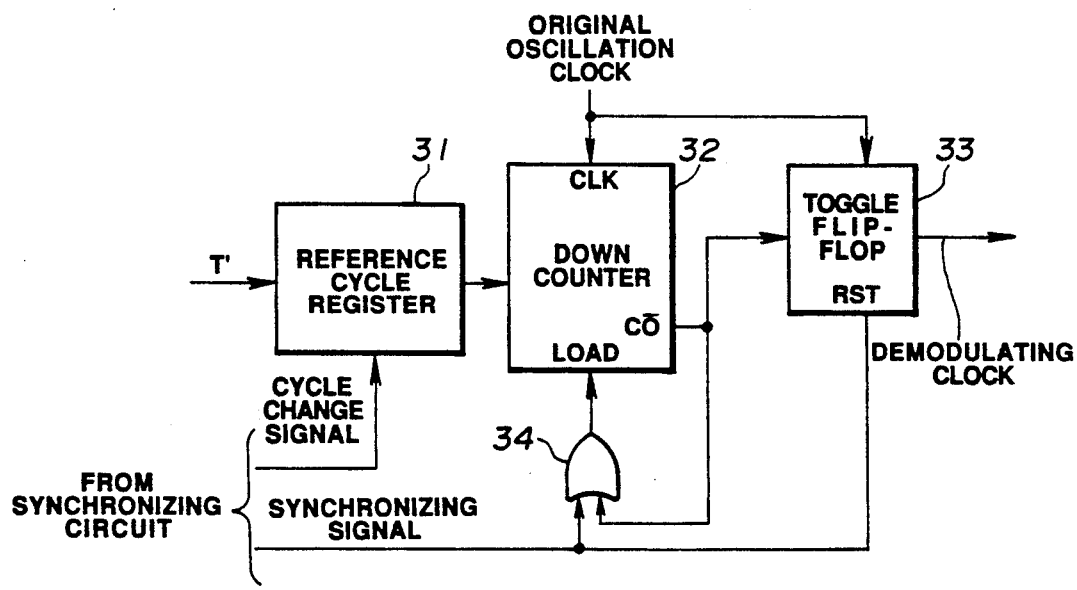

FIG. 4 shows an example of a configuration of a clock generating circuit 18. The clock generating circuit 18 includes a reference cycle register 31, a down counter 32, a toggle flip-flop 33, and an OR circuit. The reference cycle register 31 latches a reference cycle T' a reference cycle calculating circuit 17 supplies, then outputs a half or quarter value of the reference cycle T'. Specifically, when a cycle change signal has not been sent from a synchronizing circuit 14, the reference cycle register 31 supplies a half value of the latched reference cycle T' to the down counter 32. When a cycle change signal has come, the reference cycle register 31 supplies a quarter value of the latched reference cycle T' to the down counter 32.

A load terminal LOAD of the down counter 32 is connected to an input terminal of the OR circuit 34 and thus provided with a synchronizing signal sent from the synchronizing circuit 14. In response to the synchronizing signal, an output signal sent from the reference cycle register 31 is loaded, then an original oscillation clock is supplied to start down counting. When the down counter 32 completes counting, the reference cycle register 31 generates a carrier CO, and supplies the carrier CO to the toggle flip-flop 33 and to the LOAD terminal of the down counter 32 via other input terminal of the OR circuit 34. Therefore, when a carrier CO develops, the toggle flip-flop 33 reverses the polarity of an output and the down counter 32 loads an output of the reference cycle register 31 to start down counting.

The toggle flip-flop 33 inputs a synchronizing signal sent from the synchronizing circuit 14 via its reset terminal RST. With the synchronizing signal, the toggle flip-flop 33 is reset.

Thus, every after down counting is complete, the toggle flip-flop 33 reverses the polarity of the output to obtain a demodulating clock. The demodulating clock is synchronized with a regeneration output signal in given durations every time a synchronizing signal is sent from the synchronizing circuit 14.

As described previously, a demodulating clock is generated with a synchronizing signal. Even with the first synchronizing signal, a demodulating clock is synchronized with a regeneration output signal, then locked onto the regeneration output signal locks immediately.

Figure 5:
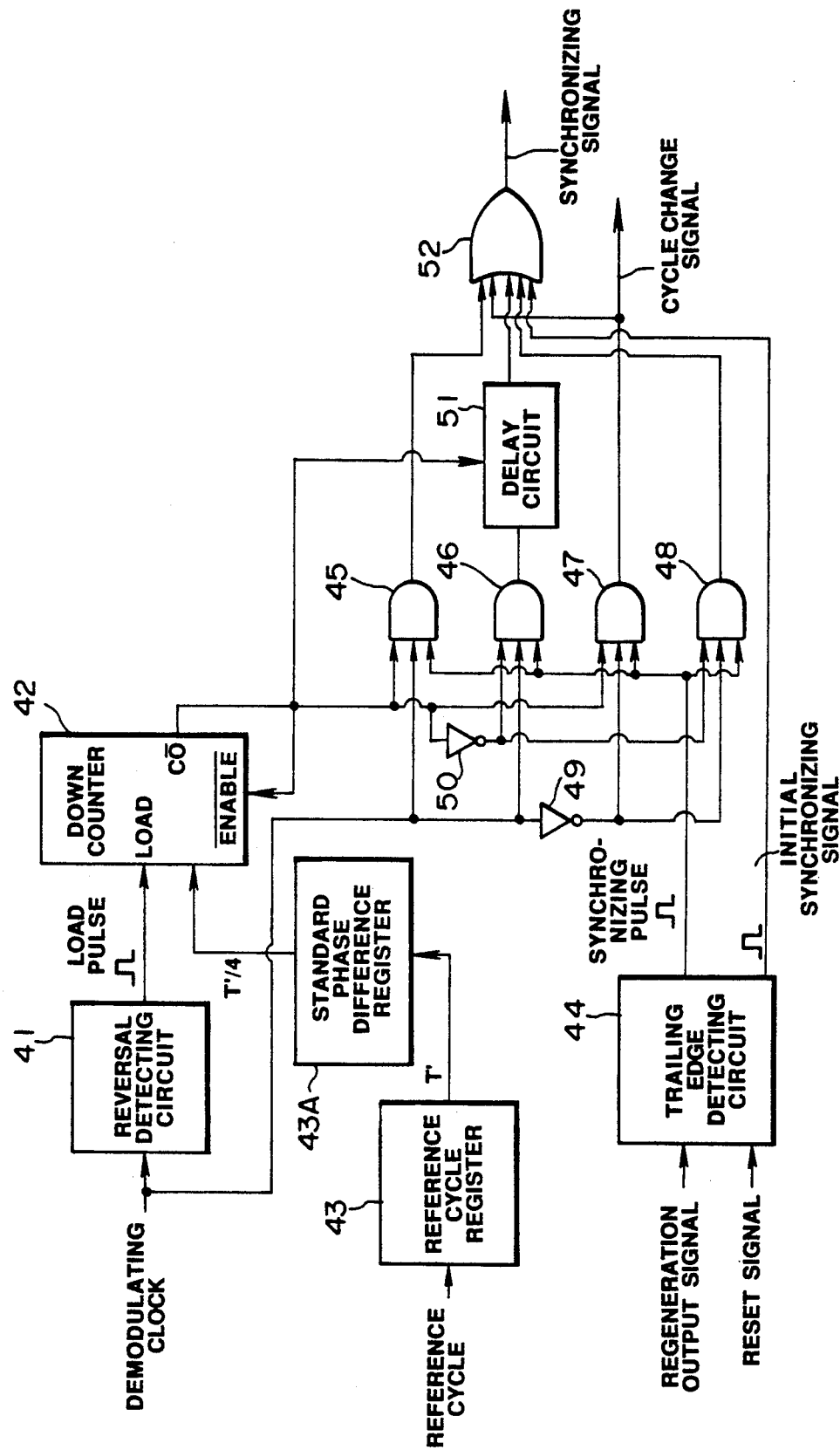
Figure 6:
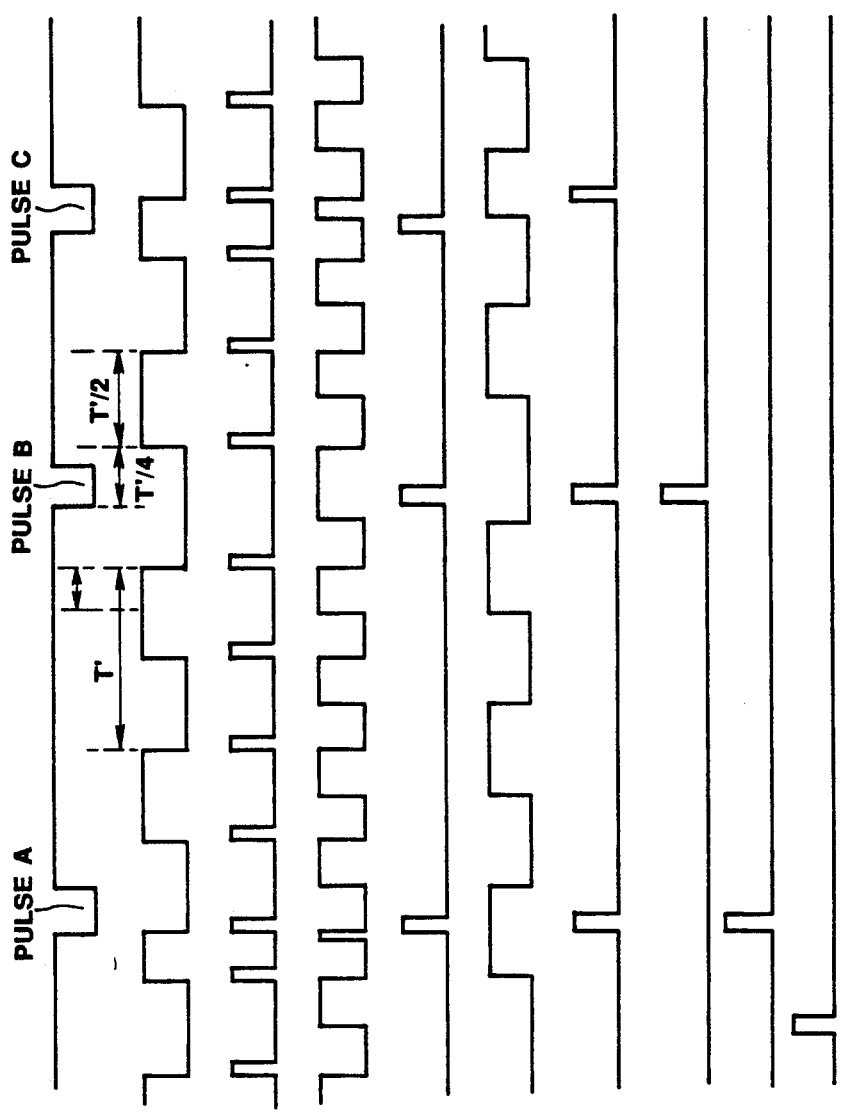

FIG. 5 is a block diagram showing an example of a configuration of a synchronizing circuit 14. FIG. 6 is a timing chart of signals sent from the components of the synchronizing circuit 14, helping explain the operation of the synchronizing circuit 14. The synchronizing circuit 14 includes a reversal detecting circuit 41, a down counter 42, a reference cycle register 43, a standard phase difference register 43A, a trailing-edge detecting circuit 44, AND circuits 45 to 48, inverters 49 and 50, a delay circuit 51, and an OR circuit 52. The synchronizing circuit 14 generates a synchronizing signal for synchronizing a regeneration output signal and a demodulating clock. A demodulating clock sent from a clock generating circuit 18 is supplied to the reversal detecting circuit 41 and to the AND circuits 45 and 46. The demodulating clock is also supplied to the AND circuits 47 and 48 via the inverter 49. A reference cycle T' sent from a reference cycle calculating circuit 17 is supplied to the reference cycle register 43, then latched. Then, the value of the reference cycle T' is supplied to the standard phase difference register 43A. The standard phase difference register 43A latches the reference cycle T' sent from the reference cycle register 43, then supplies a quarter (25%) value of the reference cycle T' to the down counter 42. A regeneration output signal sent from an amplifying/binary-coding circuit 12 is supplied to the trailing-edge detecting circuit 44. Thus, synchronization pulses synchronous with the trailing edges are produced, then supplied to the AND circuits 45 to 48.

A reset signal a control circuit 20 outputs immediately before, for example, data regeneration is supplied to the trailing-edge detecting circuit 44 of the synchronizing circuit 14. The trailing-edge detecting circuit 44 serving as an initial signal generating means receives the reset signal to open its internal gate for a given period of time. When a regeneration output signal falls with the gate open, an initial synchronizing signal is sent to the OR circuit 52. When no reset signal comes or the gate is closed, even if the regeneration output signal falls, the initial synchronizing signal does not rise. Therefore, the initial synchronizing signal is supplied only at the start of every data regeneration. A regeneration instruction signal an upper-level host computer outputs may be used as a reset signal. With power on, the control circuit 20 may send a reset signal. The gate may not only be open for a given period of time as mentioned above but also be open until the first regeneration signal pulse comes and closed when the first regeneration signal pulse comes.

A reversal detecting circuit 41 detects the leading edge and trailing edge of a demodulating clock to produce a load pulse, then supplies the load pulse to a down counter 42. In response to the load pulse, the down counter 42 loads a quarter value of a reference cycle T' sent from a standard phase difference register 43A and starts down counting. Then, the down counter 42 supplies a carrier CO generated at the completion of the counting to an enable terminal of the down counter 42, AND circuits 45 and 47, and a delay circuit 51. The carrier CO is also supplied to AND circuits 46 and 48 via an inverter 50.

An OR circuit 52 serving as a synchronizing signal generating means and outputting a synchronizing signal is provided with output signals of AND circuits 45, 47, and 48. An output signal of an AND circuit 46 is also supplied to the OR circuit 52 via a delay circuit 51. Using an output of the OR circuit 52 as a synchronizing signal, an output of the AND circuit 47 is supplied as a cycle change signal to a clock generating circuit 18.

When no factor fluctuates a regeneration output signal, if a pulse spacing is constant, the trailing edge of the regeneration output signal coincides with the trailing edge of a demodulating clock. In this example, when the trailing edge of a regeneration output signal lies in the range of +/−25% of the trailing edge of a demodulating clock, the range is recognized as a normal interval and the demodulating clock is synchronized with the regeneration output signal. This is because a regeneration output signal may distort due to a variation in relative moving rate between a regeneration head 11 and a recording medium or dust or flaws on the recording medium. Herein, a normal interval signal is generated by an exclusive OR circuit which inputs a carrier CO a down counter 42 outputs and a demodulating clock a clock generating circuit 18 outputs. In this embodiment, AND circuits 45 and 48 works similarly to the normal interval signal.

Assuming that synchronization pulses lie in normal intervals, when a regeneration output signal comes, the AND circuits 45 and 48 supply the synchronization pulses of the regeneration output signal as a synchronizing signal to a clock generating circuit 18 without any change. When a synchronization pulse lags a normal interval similarly to a pulse B in FIG. 6, the AND circuit 47 outputs synchronization pulses as synchronizing and cycle change signals. Then, the synchronizing and cycle change signals are supplied to the clock generating circuit 18. In response to the synchronizing and cycle change signals, the clock generating circuit 18 supplies a quarter value of a latched reference cycle T' of a reference cycle register 31 to a down counter 32. This shortens the first demodulating clock reverse cycle after the pulse B. As a result, a demodulating clock can be trapped in almost the same state as that when the pulse B comes without any lag. When a synchronization pulse leads a normal interval similarly to a pulse C, an AND circuit 46 outputs a synchronization pulse. Then, the synchronization pulse is supplied to a delay circuit so that the synchronization pulse will be delayed by a quarter of T'. Then, the delayed synchronization pulse is supplied as a synchronizing signal. Specifically, when the synchronizing signal lags, the first demodulating clock reserve cycle after the pulse C is prolonged. Consequently, a demodulating clock can be trapped in almost the same state as that when the pulse C comes without any lead.

Furthermore, the first pulse of a regeneration output signal similar to a pulse A can also be synchronized correctly. For example, when a reset signal a control circuit 20 outputs immediately before data regeneration comes, an internal gate of a trailing-edge detecting circuit 44 opens for a given period of time. When a generation output signal falls with the gate open, the trailing-edge detecting circuit 44 outputs an initial synchronizing signal to an OR circuit 52. Therefore, regardless of the state of a demodulating clock, a clock generating circuit 18 can trap a demodulating clock synchronous with the trailing edge of the regeneration output signal. Thus, even the first pulse of a regeneration output signal can be synchronized during data regeneration. With the demodulating clock, a demodulating circuit 19 samples sync data as shown in FIG. 7. Thus, a regeneration output pulse train can be demodulated correctly to provide precise demodulated data.

As described previously, according to the present invention, actual pulse spacings of a regeneration output signal are averaged to obtain a demodulating clock cycle. Therefore, jitter components of individual pulses can be canceled out. Moreover, even when a regeneration output signal is in phase with a demodulating clock, if a large jitter occurs, the phase of the demodulating clock may be shifted selectively depending on a lead or lag. Then, the regeneration output signal and demodulating clock are synchronized in pulse in given durations. Therefore, the demodulating clock is not locked onto an incorrect signal affected by dust or flaws on a recording medium. Thus, a demodulating clock tracking a correct signal can be produced all the time. Furthermore, a demodulating clock synchronous even with the first output signal pulse can be produced and locked onto a regeneration output signal pulse right away. Therefore, a synchronous locking pattern need not be installed on a recording medium. This contributes to expansion of the data recording capacity of a recording medium.

FIGS. 8 to 11 show the second embodiment of the present invention.

In addition to the components of the first embodiment, the second embodiment includes a sector mark detecting circuit 61 connected to an amplifying/binary-coding circuit 12 for detecting a sector mark indicating the leading address of a sector in a regeneration output signal, and a forcible synchronization period determining circuit 62 for determining a period for which a demodulating clock is synchronized forcibly in the starting area of the sector the sector mark detecting circuit 61 detects. A period determining signal the forcible synchronization period determining circuit 62 generates is supplied to a synchronizing circuit 14a. Components identical to those of the first embodiment are assigned the same symbols. The description will be omitted.

FIG. 9 shows the configuration of a synchronizing circuit 14a. A trailing-edge detecting circuit 44a for outputting synchronization pulses and an initial synchronizing signal for synchronizing a demodulating clock is provided with a regeneration output signal and a period determining signal. Other components are identical to those of the synchronizing circuit 14 of the first embodiment shown in FIG. 5.

Data is recorded in sectors. If sectors are written by different equipment or on different occasions, an interrecord gap of a signal may vary from sector to sector. In the second embodiment, the leading address of a sector is detected, then a demodulating clock is synchronized with a regeneration output signal forcibly in the starting area of the sector. Thus, synchronization is achieved reliably from the start of a sector.

FIG. 10 shows a sector mark at the leading address of a sector and the corresponding output signal waves of a sector mark detecting circuit 61 and a forcible synchronization period determining circuit 62. Normally, a track of a recording medium is divided into an ID division 71 and a data division 72 for each sector. A sector mark 73 indicating the start of a sector is recorded at the leading address of the ID division 71. The sector mark detecting circuit 61 detects the sector mark 73 and outputs a sector start signal to the forcible synchronization period determining circuit 62. The forcible synchronization period determining circuit 62 transmits a period determining signal to a synchronizing circuit 14a from the start of a sector until a predetermined period of time has elapsed. In response to the period determining signal, the synchronizing circuit 14a transmits a synchronizing signal to a clock generating circuit forcibly. Thereby, whatever phase relationship a pulse bears to a demodulating clock being generated in the starting area of a sector, synchronization can be achieved correctly.

FIG. 11 shows the waves of the components of a synchronizing circuit 14a. In a normal data interval, similarly to the first embodiment, a demodulating clock is synchronized depending on the position of a generated synchronization pulse picked up from a regeneration output signal. Specifically, when a synchronization pulse is present in a normal interval, a demodulating clock is synchronized in pulse with the synchronization pulse by matching the demodulating clock and synchronization pulse. When a synchronization pulse is outside a normal interval, a synchronizing signal which is leading or lagging the synchronization pulse is produced, then a demodulating clock is synchronized with the synchronizing signal by matching the demodulating clock and synchronizing signal. Thus, a demodulating clock is synchronized moderately depending on the position of a generated synchronization pulse. Therefore, a demodulating clock is always synchronized with a correctly-positioned signal.

On the other hand, in the starting area of a sector, a period determining signal is supplied as indicated with (k) in FIG. 11. The period determining signal has almost the same function as a reset signal for the first embodiment. With input of a period determining signal, an initial synchronizing signal is sent when a trailing-edge detecting circuit 44a detects the trailing edge of a regenerated signal. The period determining signal is always supplied for a certain predetermined period from the start of a sector.

More specifically, with the incoming first pulse of a regenerated signal produced immediately after a control circuit 20 outputs a reset signal at the start of data regeneration or a pulse A in FIG. 11, or with each of the pulses coming for a certain period after the start of each sector, a trailing-edge detecting circuit 44a outputs an initial synchronizing signal. Then, the initial synchronizing signal is supplied as a synchronizing signal by an OR circuit 52. Thereby, regardless of the state of a demodulating clock, the demodulating clock a clock generating circuit 18 produces is forcibly synchronized with the trailing edge of a regeneration output signal. Thus, a demodulating clock is locked in sectors despite a variation in recording rate among sectors. This provides a correct demodulating clock all the time. Consequently, synchronization can be achieved correctly even at the start of each sector. With the demodulating clock, a regeneration output pulse train is always demodulated correctly to provide a precise demodulated signal.

As described previously, according to the present invention, even when a regeneration output signal is in phase with a demodulating clock, if a large jitter occurs, the phase of the regeneration output signal is shifted selectively and moderately. Thus, a demodulating clock will not be synchronized incorrectly but follow a correct signal. Moreover, a demodulating clock can be precisely synchronized even with the first regeneration output signal pulse in each sector. Thereby, even the first data on a recording medium is read correctly unaffected by a variation in recording rate among sectors. Therefore, a locking pattern need not be recorded at the start of each sector on a medium. This results in effective use of a recording area on a medium as a data area.

This embodiment is a digital signal regeneration apparatus. The present invention, however, can apply to a signal regeneration apparatus using an analog PLL. In the analog system, locking is done quickly at the start of regeneration and followed by moderate synchronization. This procedure is generally known. Quick locking followed by moderate synchronization provides a signal regeneration apparatus which is resistive to a variation in signal spacing among sectors.

The present invention is not restricted to the aforesaid embodiments. A variety of modifications and variations can be formed. In the aforesaid embodiment, for example, a pulse outside a normal interval is synchronized by adjusting the lag. Alternatively, AND circuits 46 and 47 in FIG. 5 may be omitted so that pulses outside normal intervals will not be synchronized.

In the aforesaid embodiment, when a regeneration output signal falls away from a normal interval, the phase is compensated by a quarter value of T'; that is, a demodulating clock is led or lagged by a quarter of T'. Alternatively, a reference cycle register 43 and a register incorporated in a delay circuit 51 may be written by an external CPU, so that a phase compensation value may be set to a one-third of T' or a one-fifth of T'. This permits more precise phase compensation depending on the characteristic of a regeneration output signal. Consequently, a demodulating clock can be generated to correctly demodulate even a regeneration output signal which fluctuates greatly.

In the aforesaid embodiment, a reference cycle is calculated by averaging cycles. Alternatively, a mean square algorithm or other algorithm for estimating a variation in pulse duration of a regeneration output signal may be used to calculate a reference cycle.

As described previously, according to the present invention, a plurality of predetermined sequential regeneration output pulses is measured to calculate a reference cycle, a demodulating clock is generated to have the cycle, then the demodulating clock is synchronized in phase with regeneration output pulses is given durations. In a given initial range of data regeneration, the demodulating clock is synchronized in phase with a regeneration output pulse by matching the demodulating clock and regeneration output pulse. Therefore, the demodulating clock can follow a regeneration output even when a regeneration output pulse duration varies due to a fluctuation in relative moving rate between a recording medium and a regeneration head or to a difference among equipment, minimize the influence of a variation in regeneration output pulse duration due to dust or flaws on a recording medium, and reliably achieve synchronization even in the initial stage of data regeneration. Thus, data modulated and recorded using any self-clock system is demodulated correctly.

According to the present invention, it will be apparent that a wide range of embodiments can be formed on the basis of the invention without departing from the spirit and scope of the invention. This invention is limited to the appended claims but not restricted to any particular embodiment.

What is claimed is:

1. A digital signal regeneration apparatus for processing regeneration output pulses produced by binary-coding an analog signal acquired by reading information from a recording medium and thereby regenerating a digital signal recorded on the recording medium, comprising:

a pulse spacing extracting means for extracting a pulse spacing of a binary-coded regeneration output pulse;

a pulse multiple detecting means for detecting a multiple indicating the number of times a pulse spacing extracted by said pulse spacing extracting means is larger than a reference cycle;

a reference cycle calculating means for calculating a new reference cycle using the pulse spacings and multiples of a plurality of predetermined sequential regeneration output pulses sent from said pulse spacing extracting means and said pulse multiple detecting means;

a clock generating means for generating a demodulating clock having a reference cycle calculated by said reference cycle calculating means;

a clock synchronizing means for synchronizing a demodulating clock generated by said clock generating means in phase with regeneration output pulses in given durations, and synchronizing the demodulating clock in phase with a regeneration output pulse coming in a given initial range of data regenerated not by locking the demodulating clock in a given duration but by matching the demodulation clock and the regeneration output pulse coming in the given initial range; and a demodulating means for demodulating a binary-coded regeneration output pulse train using a demodulating clock generated by said clock generating means.

2. A digital signal regeneration apparatus according to claim 1 wherein said given initial range said clock synchronizing means uses to synchronize a demodulating clock in phase with a regeneration output pulse is a range ending with the first incoming regeneration output pulse in the initial stage of data regeneration, and said clock synchronizing means synchronizes said demodulating clock in phase by matching said demodulating clock and said first incoming regeneration output pulse.

3. A digital signal regeneration apparatus according to claim 1 wherein said given initial range said clock synchronizing means uses to synchronize a demodulating clock in phase with a regeneration output pulse is a given starting range of a sector, and said clock synchronizing means synchronizes said demodulating clock in phase by matching said demodulating clock and a regeneration pulse coming in said given starting range of a sector.

4. A digital signal regeneration apparatus according to claim 1 wherein said clock synchronizing means includes an initial synchronizing signal generating means for identifying said given initial range, detecting a regeneration output pulse in said initial range, then outputting an initial synchronizing signal, and a synchronizing signal generating means for outputting said initial synchronizing signal as a synchronizing signal for synchronizing the demodulating clock in phase in said initial range.

5. A digital signal regeneration apparatus according to claim 4 further comprising a control means for outputting a reset signal indicating the start of data regeneration, said initial synchronizing signal generating means identifying the start of said initial range using the reset signal sent from said control means, detecting a regeneration output pulse coming first after the reset signal is sent, then outputting an initial synchronizing signal.

6. A digital signal regeneration apparatus according to claim 4 further comprising a sector leading address detecting means for detecting the leading address of a sector and outputting a sector start signal, and a forcible synchronization period determining means for determining a forcible synchronization period in which said demodulating clock is forcibly synchronized with said regeneration output pulse in the starting area of a sector or said given initial range according to a sector start signal sent from said sector leading address detecting means, said initial synchronizing signal generating means identifying said initial range using a period determining signal outputted by said forcible synchronization period determining means, detecting a regeneration output pulse while said period determining signal is being supplied, then outputting an initial synchronizing signal.

7. A digital signal regeneration apparatus according to claim 1 wherein said duration in which said clock synchronizing means synchronizes a demodulating clock in phase with a regeneration output pulse is a quarter of said reference cycle by which the demodulating clock is leading or lagging said regeneration output pulse.

8. A digital signal regeneration method for demodulating data despite a fluctuation in reading rate or variation in regeneration pulse duration due to abnormalities in a recording medium from which data is read, the digital signal consisting of output pulses produced by binary coding an analog signal which is acquired by reading information from the recording medium, comprising the steps of:

extracting a pulse spacing of a binary-coded regeneration output pulse;
detecting a multiple indicating the number of times the extracted pulse spacing is larger than a predetermined reference cycle;
calculating a new reference cycle using the extracted pulse spacings and the detected multiples of a plurality of predetermined sequential regeneration output pulses;
generating a demodulating clock having the new reference cycle;
synchronizing the demodulation clock in phase with regeneration output pulses in given durations, and synchronizing the demodulating clock in phase with a regeneration output pulse coming in a given initial range of data regenerated not by locking the demodulating clock in a given duration but by matching the demodulating clock and the regeneration output pulse coming in said initial range; and
demodulating a binary-coded regeneration output pulse train using the demodulating clock.

9. The method of claim 8, wherein the synchronizing step further comprises the steps of:
identifying said initial range;
detecting a regeneration output pulse in said initial range; and
outputting an initial synchronizing signal as a synchronizing signal for synchronizing the demodulation clock in phase with said initial range.

10. The method of claim 9, further comprising the steps of:
outputting a reset signal indicating the start of data regeneration,
wherein said identifying step includes identifying the start of said initial range using the reset signal, and
wherein said detecting step includes detecting the regenerating output pulse coming first after the reset signal is sent.

11. The method of claim 9, further comprising the steps of:
detecting the leading address of a sector and outputting a sector start signal; and
determining a forcible synchronization period in which said demodulating clock is forcibly synchronized with said regeneration output pulse in the starting area of a sector or said initial range according to the sector start signal, wherein said identifying step identifies said initial range using a signal representing said forcible synchronization period.

* * * * *